United States Patent [19]
Ruby

[11] Patent Number: 5,824,382
[45] Date of Patent: *Oct. 20, 1998

[54] CONTROL OF DELAMINATION IN CONTOURED LAMINATED STRUCTURES

[76] Inventor: Victor L. Ruby, Lealand Design, 1736 Fleet St., Baltimore, Md. 21231

[ * ] Notice: The term of this patent shall not extend beyond the expiration date of Pat. No. 5,618,601.

[21] Appl. No.: 678,067

[22] Filed: Jul. 10, 1996

Related U.S. Application Data

[63] Continuation of Ser. No. 174,318, Dec. 30, 1993, Pat. No. 5,618,601.
[51] Int. Cl.$^6$ ............... B32B 3/10; B32B 3/14; B32B 3/30
[52] U.S. Cl. ............. 428/56; 428/55; 428/167; 428/172; 52/631
[58] Field of Search ............... 428/56, 55, 167, 428/172, 188; 52/631

[56] References Cited

U.S. PATENT DOCUMENTS

| | | | |
|---|---|---|---|
| 2,253,219 | 8/1941 | Alexander | 52/807 |
| 3,003,205 | 10/1961 | Frashour et al. | 52/807 |
| 3,540,967 | 11/1970 | Shook et al. | 156/363 |
| 4,536,427 | 8/1985 | Kohn | 428/44 |
| 5,232,762 | 8/1993 | Ruby | 428/167 |
| 5,618,601 | 4/1997 | Ruby | 428/56 |

OTHER PUBLICATIONS

Paper Backers Lend Economical STrength in Furniture Production; Furniture & Cabinet Manufacturing; pp. 2–4; publication Oct. 1987.
Goodrich SPecialty Polymers & Chemicals Division; 5 pages; Dec. 1988.

*Primary Examiner*—Alexander Thomas
*Attorney, Agent, or Firm*—Watson Cole Stevens Davis, PLLC

[57] ABSTRACT

A structural element made of a high impact sheet material, a resilient, semi-flexible core material, and a plurality of independent, preformed parallely-spaced rib members extending substantially across the width of said sheet material and fixedly attached thereto by an adhesive with said sheet material being flat, said plurality of rib members having adjacent, confronting side surfaces substantially parallel to one another, the forces created by bending of the structural element producing fractional detachment between at least some of said rib members and said sheet material being controlled by the width and height of said rib members and the distance between adjacent rib members and thereby determining the limit of bending of said structural element, thereby enabling a smooth surface of said high impact sheet material by preventing ripples and ridge lines therein with the bending of said structural element.

5 Claims, 5 Drawing Sheets

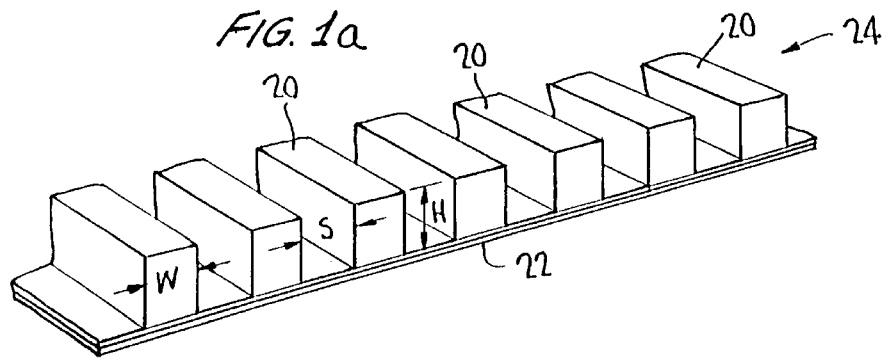
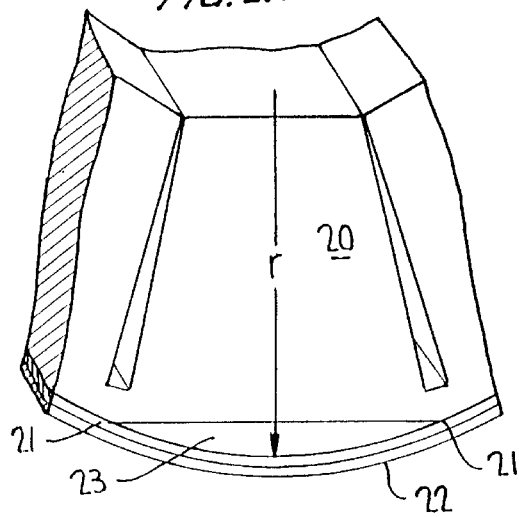
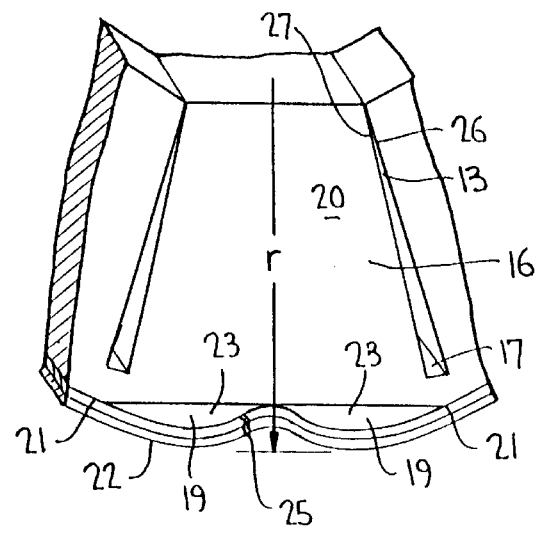
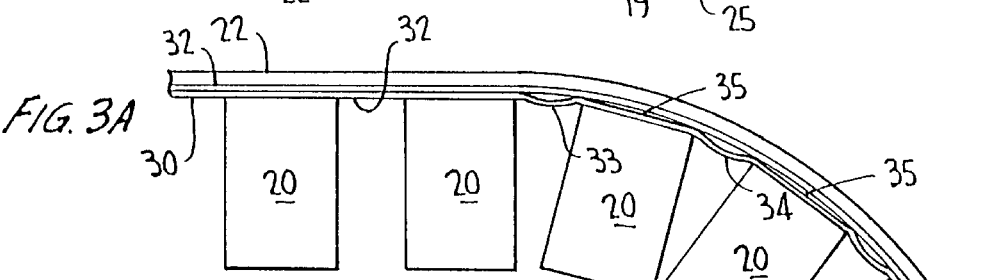
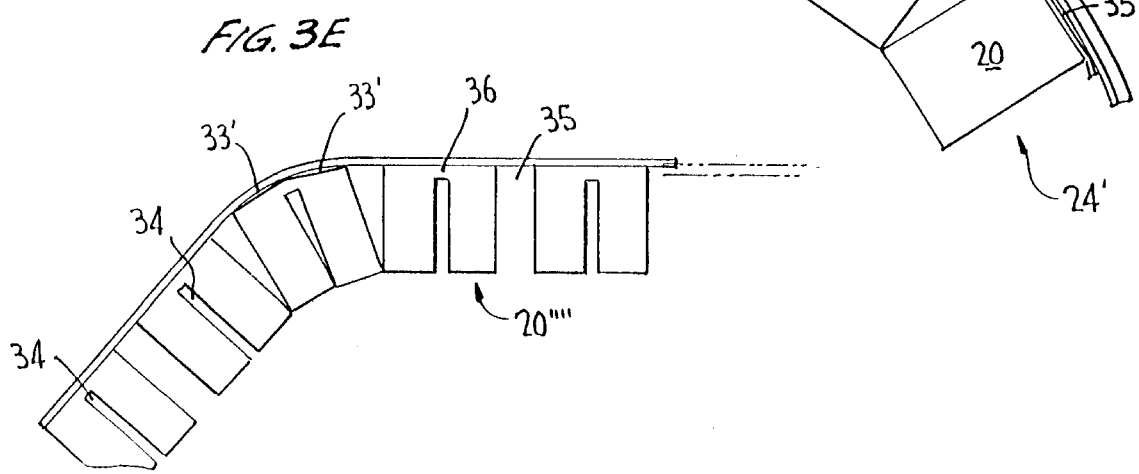

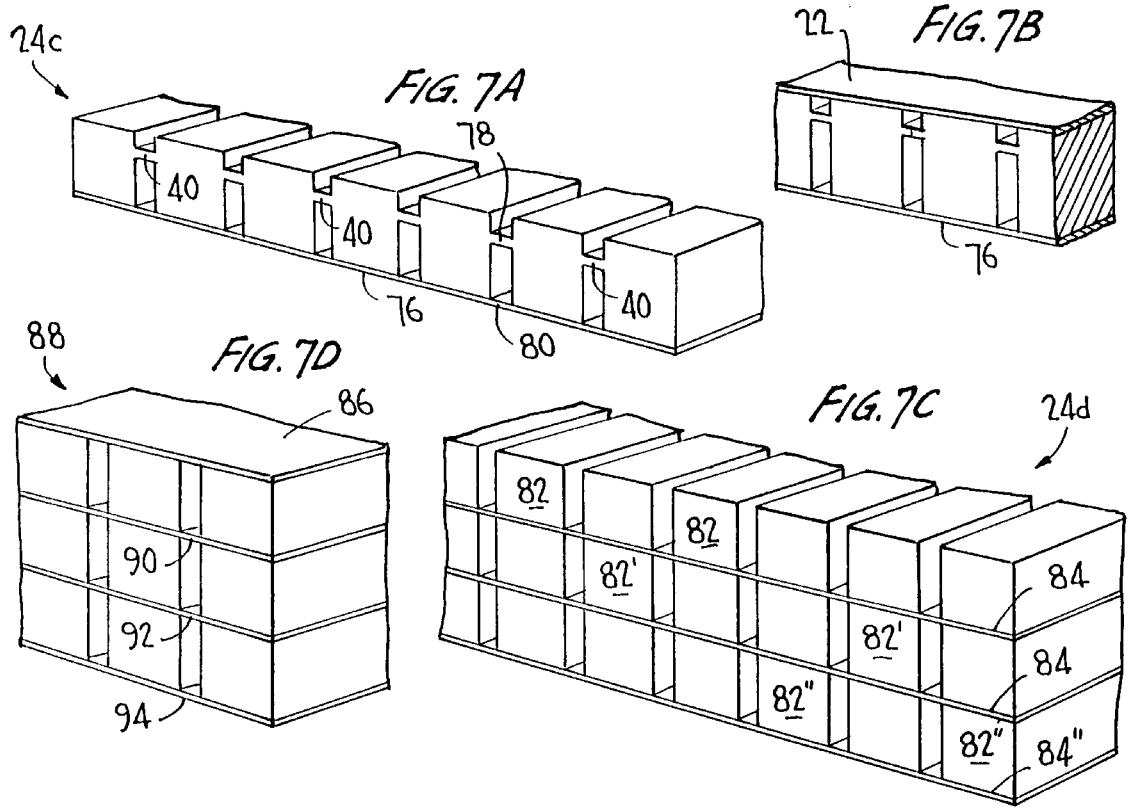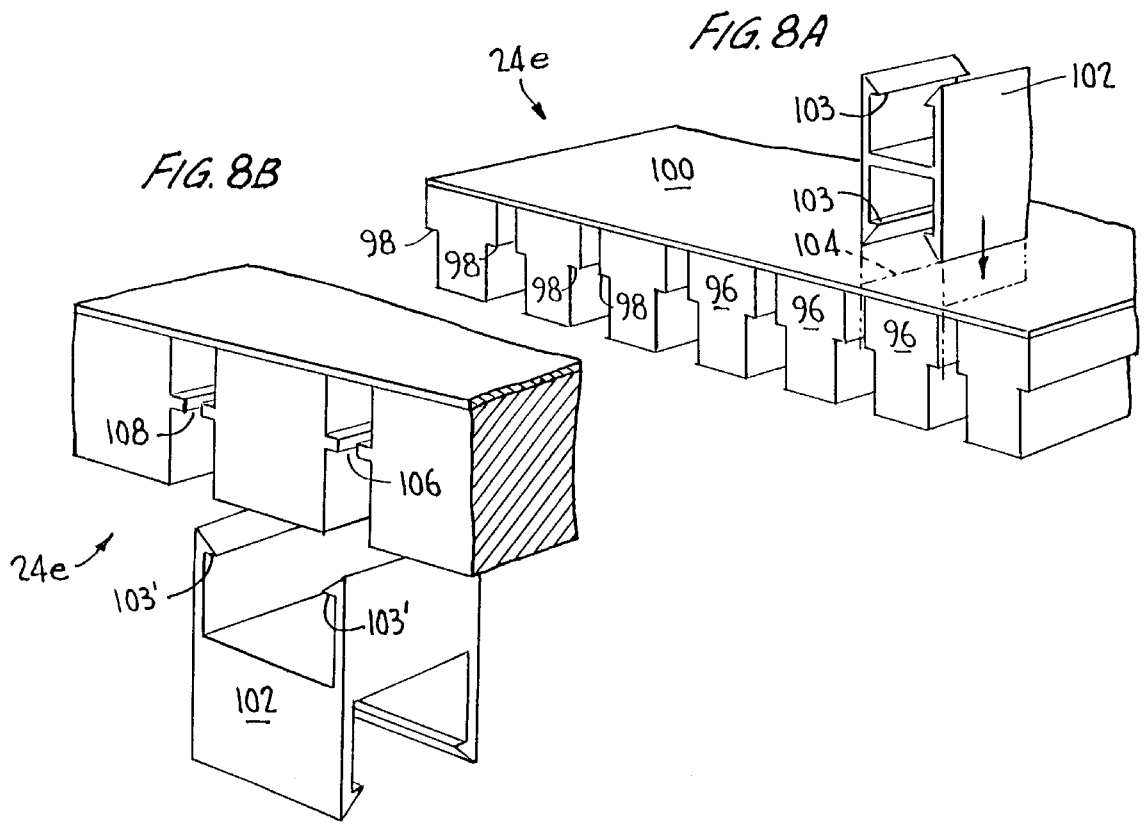

CONTROL OF DELAMINATION IN CONTOURED LAMINATED STRUCTURES

This application is a continuation application of application Ser. No. 08/174,318, filed 30 Dec. 1993 now U.S. Pat. No. 5,618,601.

BACKGROUND OF THE INVENTION

1. Field of the Invention

This invention relates to methods for controlling the delamination within contoured laminated structures and to the structures for carrying out such methods, and more particularly to such methods and structures for limiting or preventing delamination within laminated structures comprising at least one facing laminate and a plurality of spaced ribs attached thereto, and that is either adapted to be configured into a curved shape, thereby maintaining a desired appearance of the laminated structure, or remains in a flat, non-distorted condition to be used to cover a flat surface area.

2. Related Art

The development and subsequent proliferation of high impact decorative surface materials has prompted many changes in the cabinet and architectural industry. These changes included new adhesives, tools, fasteners and assembly techniques. The substrate cores of choice for lamination are composition board for flat panels and papers or plywood for contours.

In most cases, the flat, average size panels are easy to laminate, handle and assemble and are relatively stable. This is not the case when using large panels, contours or closed loop designs. Although many decorative surface materials are durable and flexible, most fabricators are reluctant to produce contoured structures because rigid contoured components are not compatible with flat-line production systems and require special hands-on labor, intensive handling, laminating and assembly methods.

As an additional deterrent to the use of such panel structures is that all of the wood base cores expand and contract in response to the atmosphere at different rates of movement than the surface sheet. This dynamic tension is potentially damaging to the surface sheet and glue line or both.

Laminated strips, including at least an outer surface strip having scuff-resistance characteristics, for example, and a desired eye appeal, and a core material, are formed over partially or fully curved structural surfaces such as columns, pillars, kitchen counters, etc., and permanently retained by the use of an adhesive between the inner surface of the laminated strip and the structural surface. The deformation of the laminated strip to form the desired contour shape produces stresses and strains tending to distort the laminated strip, separating it from the structural surface—a process called leveraged delamination. These forces and stresses are primarily caused by a lever and fulcrum action resulting from the bending of the laminated strip to conform to the structural surface, although changes in temperature and humidity are also contributing factors in the build-up of structural stress. Such delamination degrades the surface appearance of the laminated strip and may even adversely affect the adhesion of the laminated strip to the structural surface depending on the severity of the forces causing the delamination. The forces and stresses causing delamination increase with the degree of bending of the laminated strip to conform it to the shape of the structural surface.

The phenomena of delamination is determined by parameters such as the strength of the adhesive, the laminated strip and the structural surface. If the laminated strip is weaker than the adhesive, for example, the laminated strip will distort or tear before delamination occurs. However, if the adhesive is weak, then delamination will occur before distortion or tearing of the laminated strip. It is thus obviously desirable to design the laminated strip and select the adhesive to provide a controlled delamination of the laminated strip to prevent distortion or damage thereto.

U.S. Pat. No. 5,232,762, issued to the same inventor as the subject application, relates to a structural element for initial, substantially flat attachment to the surfaces of high impact sheet materials, and adapted for attachment to curved surfaces and includes a first resilient, semi-flexible, sheet material having a given length and width; a second, flexible sheet material of substantially the same width as the first sheet material; a plurality of parallely-spaced, independent preformed rib members sandwiched between the first and second sheet material and each rib member extending substantially across the width of the first and second sheet material and fixedly attached to both the first and second sheet material by an adhesive with the first and second sheet material being flat, the width and height of the preformed rib members and the distance between adjacent rib members determining the limit of bending of the first or second sheet material; and at least one of the first and second sheet material being shearable, thereby enabling areas and the degree of bending within the areas of the first and second sheet material to be determined by the selective cutting of only the at least one sheet in the spaces formed between the plurality of rib members. In an alternative embodiment only one sheet of flexible mateiral is used and the bending of the structural element is determined solely by the spacing between the rib members and their height and width.

U.S. Pat. No. 4,536,427 relates to laminated contoured structures in which the yieldability of the adhesive material between a facing sheet and the core material enables "contouring" of the laminated structure. The adhesive used remains pliable or toffee-like to allow the necessary separation between the scrim and the core.

U.S. Pat. No. 3,540,967 discloses contour-core structures in which the adhesive material between a scrim and the core is dislodged to enable the structure to conform to a curved-shape surface.

Controlling the properties of the adhesive is also an important factor in preventing "telegraphing" or the creation of flex lines or cracking in the laminated strip. Too strong an adhesive preventing delamination results in such cracking or the creation of flux lines in the outer surface of the laminated strip.

Thus, it is desirable to control the delamination of the adhesive from the structural surface and/or control the delamination of the laminated structure from the adhesive in order to prevent the aforementioned problems from occurring. As is evident from the above discussion, prior attempts to achieve controlled delamination rely entirely on the selection of a proper adhesive. Very little consideration has been given to the flexibility of the laminated strip itself in controlling the delamination of the laminated strip from the structural surface.

SUMMARY OF THE INVENTION

KERFKORE is a registered trademark pertaining to laminate structures of the type described herein and is owned by the same inventor as the present application.

The KERFKORE structure of the invention can be uniformly laminated, milled and drilled using flat-line mass production machines and stored flat for later selective constrained cold forming of core and surface sheet simultaneously into stabilized contoured panel elements suitable for attachment to "coreless" type cabinet and architectural framing.

The basic structure of the invention comprises a structural element for attachment to curved surfaces in which a plurality of parallely-spaced, independently preformed rib members are sandwiched between at least two, first and second sheet material members; with the rib members extending substantially across the width of the first and second sheet material members and fixedly attached to both the first and second sheet material members by adhesive material with the structure being flat, the width and height of the preformed rib members, the distance between adjacent rib members and the strength of the adhesive determining the limit of bending of the first and second sheet material members. At least one of the first and second sheet members being shearable, thereby enabling areas and the degree of bending within said areas of the first or second sheet material to be determined by the selective cutting of only one of the at least one sheet in the spaces formed between the plurality of rib members.

An alternate manner of describing the laminate structure of the invention is to define it as being a pliantly diffusive, composite structure formed of an initially flat, selectively flexible composite structure disposed for pliantly, spontaneous, fractional, intermittent diffusion and comprising a surface sheet of high impact, semi-rigid material bonded flat to a diffuse, segmented plurality of structural material extending substantially across the expanse of the surface sheet material with the segments being spaced and sized in a pattern rendering tenuous the otherwise permanent flat bond against flexing tensions of the surface sheet material and limiting the surface sheet flexing angle of interference to minus 20 degrees between adjacent segments in at least one direction, the flexing of the complete assemblage resultant in fractional intermittent detachment between elements of the composite structure, thus dispersing potentially damaging concentrations of stress and preserving the structural integrity and smooth visual continuity of the originally flat composite structure either in repititous flexing motion as a curved sliding door or in a fixed position as a contoured structure.

A primary object of the present invention is to control the delamination of a flat laminated structure (basically as defined above) caused by bending to be conformed into the curved contour of a structural surface by increasing the flexibility of the laminated strip structure to reduce the stresses and forces tending to induce the delamination.

Another object of the invention is to provide both a course and a fine adjustment of the bendability of the laminated strip by varying the size and spacing of the ribs in the core of the laminated strip to obtain a course bendability adjustment, and to provide severable connecting ribs within the rib elements for obtaining a fine bendability adjustment of the laminated strip.

It is a further object of the invention to provide a method and structure for obtaining a selectable, variable bendability adjustment of the laminated strip by selectively scoring a laminated sheet of the laminated strip between the spaced ribs.

Yet another object of the invention is to provide a method and structure for controlling delamination in laminated structures as disclosed herein by using a compressed latex paper scrim between the facing laminate of the laminated structure and the structural surface to absorb certain of the stresses and forces causing delamination to aid in obtaining the desired contour of the laminated structure.

And still another object of the invention is to provide variable-width scoring of a backing sheet in the laminated sheet structure in conjunction with the size and spacing of the ribs in the core structure of the laminated strip to control delamination.

Another purpose of this invention is to provide a group of structural substrate reinforcement cores of different cross-sections but similar purpose when in bonded combination with high impact surfacing materials such as, high pressure laminates, sheet metals and the like suitable for attachment to cabinet and architectureal framing or as self-contained, closed loop, monoformed structures engineered to be instrinsically subservient to and dynamically influenced by said surface sheets at rest in the initial flat condition, in mechanically forced motion, under the sustained stress of curved configurations, or atmospherically induced dimensional changes.

Imperative to the feasibility and functionality of laminated core structures such as described herein, there is the control of the perpetual dynamic tension between the essential elements contained in laminated components, core, adhesives and the surface sheet(s).

When tenuously bonded to surface sheet the core maintains permanent dynamic equilibrium between the three elements.

A flat and unstressed core produces impalpable adjustments dictated by the surface sheet due to atmospheric changes.

When the flat core sheet is moved from a flat condition to a contoured condition, there is a mechanical lever and fulcrum effect that tends to peel the surface sheet away from portions of the segments to dispose concentrations of stress, which action can be designated as leveraged delaminations.

The conventional method of producing grooved or mitered panels comprises two phases, namely, (1) simply bond the flexible sheet to an unmilled panel and (2) cut completely through to the sheet in "one pass". The cutters are usually pointed and adjusted to lightly score the sheet (especially if it is metal) to weaken and define each ply point.

The objective in producing KERFKORE is to avoid weakening, or in any way scoring, the sheet facing material at the flex point area.

To eliminate the damaging effect from the close proximity of the cutters to the sheet and to reduce flex point gap variations due to worn cutters, the raw panel is partially scored in one pass before laminating and then cut through on a second pass after laminating.

BRIEF DESCRIPTION OF THE DRAWINGS

The above objects, features and advantages of the invention are readily apparent from the following description of preferred embodiments of the best mode of carrying out the invention when taken in conjunction with the following drawings, wherein:

FIGS. 2a and 2b shown the various causes and effects of delamination between the rib and laminate facing sheet of a laminate structure;

FIG. 3a illustrates the use of a compressed latex paper scrim between the laminate-sheet-facing material and the spaced ribs to obtain delamination control in accordance with the present invention; FIG. 3e is a further modified embodiment in which the laminate includes alternately-reverse-directed through cuts as a means of controlling the delamination of the laminate structure;

FIG. 6b is a cross section of the structure of FIG. 6a;

FIG. 7a is an exemplary embodiment of a multiple web KERFKORE sheet and FIG. 7b shows a detail of the sheet structure; FIG. 7c is another exemplary embodiment of the invention showing a multi-layered web structure; and FIG. 7d illustrates the manner in which the webs are scored to enable the multi-layered structure to bend; and FIG. 8a shows a laminated structure in accordance with the invention in which the structure is reversible depending upon the size of the radius of the bend and which can accommodate an accessory attachment; and FIG. 8b illustrates the use of the accessory attachment.

DETAILED DESCRIPTION

Figure 1B:
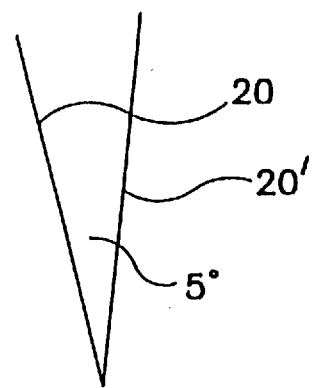
FIG. 1 shows a plurality of rib members adhered to a facing sheet with suitable spacing to control delamination in a basic laminated structure in accordance with the present invention.

The basic construction of a sublaminate structure which is used to form laminate structures in accordance with the invention is shown in FIG. 1a. As shown in FIG. 1a, the plurality of rib members 20 are attached to a high impact laminate-facing-sheet 22 by a suitable adhesive to form a flat sublaminate structure 24. Sublaminate structure 24 is intended to be used in both a flat or a curved configuration, i.e. to be fastened to an essentially flat surface or to be bent to conform to a curved surface so that in both instances the laminate structure forms a facing providing a smooth desired appearance having high resistance to being gouged, marred or otherwise damaged. The width w, height h and spacing s of the rib members 20 are all factors determining the upper limit of bending of the sublaminate structure 24 where that structure is to be used to conform to a curved surface.

Additional factors controlling the degree of bending of the laminate structure 24 are the flexibility of the high impact laminate-facing-sheet member 22 and the strength of the adhesive used to attach the plurality of rib members 20 to the laminate-facing-sheet member.

For the purposes of the invention, it is assumed that one of ordinary skill in the art will recognize that it is necessary that the flexibility of the laminated-facing-sheet material 22 must be such that it can be bent to the maximum radius without producing any distortion in the appearance of the laminate-facing-sheet material such as would occur by cracking, telegraphing or actual severance of the laminate facing sheet from the substrate. The laminate structures in accordance with the invention are capable of being bent with at least a three inch radius.

Thus the factors affecting the bendability of a laminate sheet-facing material in accordance with the invention are the height h and width w of the rib elements 20, the spacing s between the rib elements and the adhesion between the rib members 20 and the facing-sheet 22. The adhesion between the rib members 20 and the facing-sheet 22 is in turn determined by the strength of the adhesive used to attach the rib members to the facing-sheet and the leverage applied by the bending of the facing-sheet 22 to the adhesive and the rib members.

The spacing s between the rib members 20 and the height h of the rib members are selected to accommodate the maximum bending radius necessary for the particular application of the laminate structure 24. It is apparent that the greater the height h and the width w of the rib members 20 the greater must the spacing s be between the adjacent rib members.

It is also apparent that the greater the width w of the rib members 20, the greater will be the leverage force applied by the sheet-facing material 22 to delaminate or separate the rib members from the sheet-facing material 20 for any given radius of bending of the sublaminate structure 24. Moreover, the greater the radius r of bending of the sublaminate structure 24, the greater will be the leverage force tending to delaminate or separate the rib members 20 from the sheet-facing material 22 for any given width w of the rib members. Furthermore, for any given width w of the rib members 20 and the radius r of bending of the sublaminate structure 24, the strength of the adhesive bonding between the rib members 20 and the sheet-facing material 22 will determine the delamination of the rib members from the sheet-facing material. Thus, the adhesive bonding must not exceed the fracture strength of the sheet-facing material, thereby enabling a controlled delamination to occur so that the basic sublaminate structure 24 can be bent to the desired radius without fracturing the surface sheet-facing material 22. Also, the adhesion bond must be of sufficient strength to enable the rib members 20 outside the area of bending of the sheet-facing material 22 to remain bonded thereto.

However, for purposes of describing the practical limits of the maximum bending radius R, it is more convenient to define the maximum bending radius R as a function of the angle between adjacent rib members with respect to the thickness of the rib members as shown in Examples I, II and III below as opposed to defining a great number of relationships between the spacing s, height h and width w of the rib members.

As shown in Example I, with a 1¾" height h of the rib members it is practical to obtain an approximate maximum angle of 5 degrees between adjacent rib members at the point of maximum bending of the laminate substrate. In Example II, with a rib member height h of ⅞" a range of between 6–12 degrees angle between the adjacent rib members is possible. Finally, in Example III with a rib member height h of 7/16" an approximate maximum angle of 17 degrees between adjacent rib members is possible.

It will be apparent to those skilled in the art of laminated structures that other relationships between these parameters will produce laminated structures in accordance with the invention.

The various structural causes and effects of controlling delamination between the rib and laminated-sheet facing material of a basic sublaminate structure generally of the type used in the invention are illustrated in FIGS. 2a and 2b for the purpose of demonstrating the factors affecting delamination. FIG. 1a illustrates a desired delamination of the rib member 20 from the facing sheet material 22 as caused by the leverage produced between the ends of the rib member by curvature of the sheet-facing material to a desired radius. A space 23 is produced by the separation of the rib member 20 from the sheet-facing material 22; however, the rib member remains attached, or at least in abutting relationship at end portions 21, with the sheet-facing material. In the event that the radius of bending of the sublaminate structure 24 is greater than that shown in FIG. 1a, it is desirable that delamination occur between several rib members 20 and the sheet facing material 22 with contact remaining at the outer edges of the delaminated rib members and the sheet-facing material.

FIG. 1b illustrates an instance in which improper delamination has occurred whereby the sheet-facing material 22 remains attached to the rib member 20 in an area between two delaminated areas 19. Such improper delamination most likely results from a too flexible sheet-facing material 22 accompanied by the use of too strong an adhesive, thereby enabling a fracture 25 to occur in the sheet-facing material.

The controlled delamination techniques of the present invention enable a wider variation in the constraints placed on the height h, width w and spacing s parameters as discussed above. For example, it is apparent as shown in FIG. 2a that if the spacing s is too narrow for the degree of bending (radius r ) the respective edges 26, 27 of adjoining rib members 20 will abut prior to the completion of the bending of the sublaminate structure 24 so that increased delamination pressure will be applied to the adhesion between the rib member(s) 20 and the sheet facing material 22. This will cause additional delamination between the rib member(s) 20 and the sheet-facing material 22.

To enable such delamination to occur without damage to either the rib members 20 or the sheet facing material 22, it is readily apparent that the adhesive bond between the rib members and the surface sheet-facing material 22 must be of less strength than the fracture or shearing strength of either the rib members or the sheet facing material. In the case where the sublaminate structure 24 includes only an adhesive between the rib members 20 and the sheet facing material 22, only the strength of the adhesive is available as the factor controlling the delamination (assuming a given rib member, sheet-facing material, and width w, height h and spacing s between the rib members).

However, in accordance with another embodiment of the invention, the basic sublaminate structure 24 illustrated in FIG. 1a may be modified to include a backing web member between the plurality of rib members and the sheet-facing material as shown in FIG. 3a. As illustrated in FIG. 3a a compressed latex paper scrim 30 is formed between sheet-facing material 22 and rib members 20 with the adhesive 32 bonding the scrim 30 to the individual rib members 20. Thus when the modified sublaminate structure 24' is bent to form a given radius r, the scrim 30 separates from the sheet facing material 22 to provide the controlled delamination necessary to enable the sublaminate structure 24' to achieve the desired bending radius as shown at areas 33, 34 between the affected adjacent rib members 20 and in the delamination control area 35. In areas 33, 34 the scrim 30 laterally yields to the changing dimensions of the sheet facing material 22 caused by the bending radius r. To obtain this result the adhesion between the scrim 30 and the sheet-facing material 20 must be less than the adhesion between the scrim 30 and the plurality of rib members 20.

The practical effect of this embodiment of the invention is that the constraints on the strength of the adhesive bond between the sheet-facing material 22 and the rib members is divided, thereby enabling the adhesion between the scrim 30 and the rib members 22 to be different than that between the sheet-facing material 22 and the scrim 30. This affords a greater flexibility in the selection of the adhesives than with the first embodiment of FIG. 1 without the scrim and wherein there is only one adhesive. Therefore, the adhesive strength is determined by the different adhesion between the adhesive and the sheet-facing material and the adhesion between the adhesive and the individual rib members.

Figure 3B:
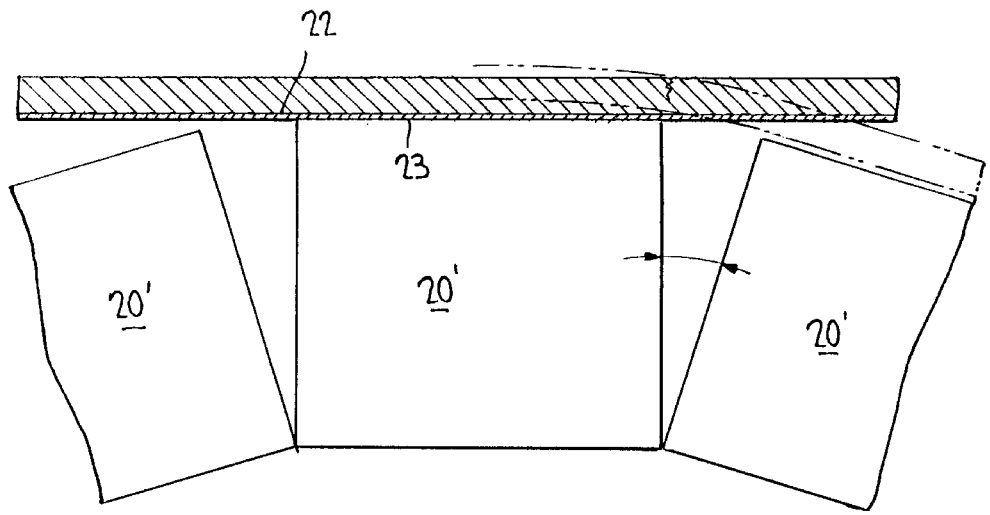
FIG. 3b is an enlarged view of a section of a laminate constructed in accordance with the invention illustrating the principle of leveraged delamination.

FIG. 3b represents an enlarged view of a cross section of a laminate substrate in accordance with the invention and illustrating leveraging action of the surface sheet 22' along the contacting surface 23 between the surface sheet 22' and the rib member 20' which produces a maximum stress point at the edge 25 of the rib member which stress is controlled by the angle of interference 27 between adjacent rib members 20' as shown in the drawing. It is apparent that the larger the angle of interference 27 the larger the maximum stress that is produced to cause delamination of the laminate substrate.

Figure 3C:
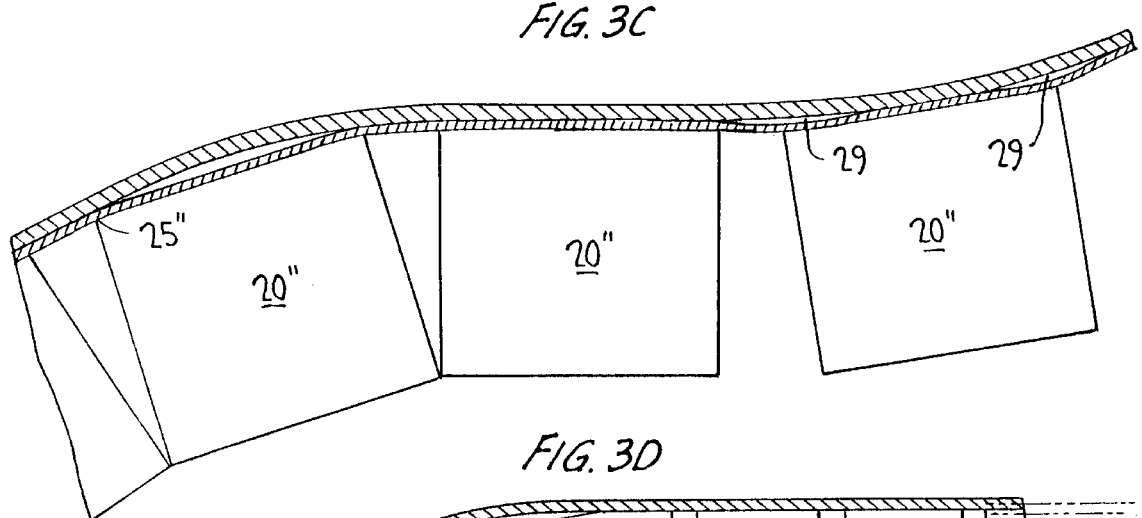
FIG. 3c is another enlarged view of a laminate constructed in accordance with the invention illustrating the principle of leveraged delamination with a doubly bent or compund bent laminate.

FIG. 3c illustrates the two different types of delamination produced in a laminate substrate according to the invention and which is subjected to a double bending moment such that delamination is produced in the center of a rib member 20" with compressive forces existing at each corner 25" of the rib member 20". At the right hand side of the laminate structure delamination occurs at each corner 29 of the rib member 20" with a compressive force existing in the middle of the rib member 20". Thus, the location of the compressive forces enables the laminate substrate to endure a reverse bending as illustrated in the Figure.

Figure 3D:
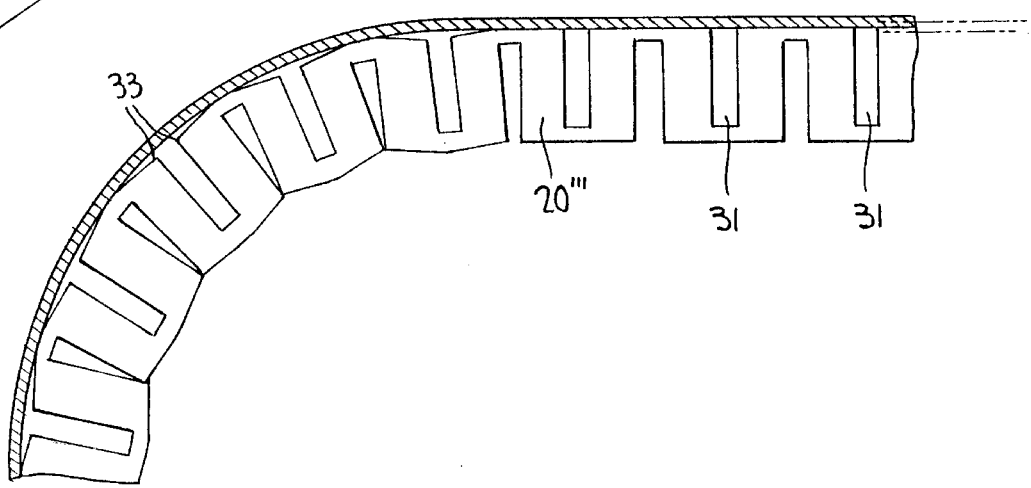
FIG. 3d is a modified embodiment in which the laminate includes alternately-directed through cuts as a means of controlling the delamination of the laminate structure.

FIG. 3d illustrates a modified embodiment of the laminate substrate of the invention in which the rib member 20''' is a core material in which alternate through cuts are made to enable the laminate substrate to be contoured and wherein the delamination effects are just the opposite of those previously described with respect to FIGS. 3b and 3c. As seen in FIG. 3d, the delamination occurs in a space 33 opposite a through cut on the opposite side of the laminate and between the through cuts which are involved in producing the bending of the laminate substrate.

FIG. 3e illustrates a further embodiment of the invention which represents a modification of the embodiment shown in FIG. 3d. The rib member 20'''' is a core material in which the alternate through cuts are made opposite to that shown in FIG. 3d and wherein the delamination occurs in a space 33', approximately in the middle of a rib member. The intermediate cuts 34 provide bi-level bend radii; and primary and secondary flex points 35 and 36 are respectively provided. This modification provides more flex points per linear measure without reducing the bonding surface and requires less delamination by allowing the rib members to camber between primary flex points and thus maintain more contact with the surface sheet.

Figure 1C:
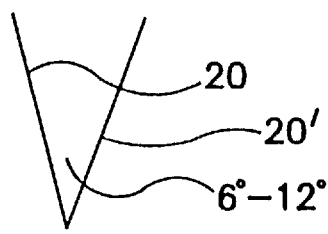
Figure 1D:
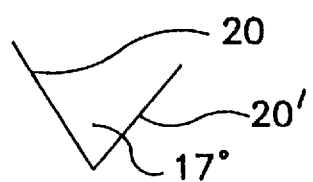
Figure 4:
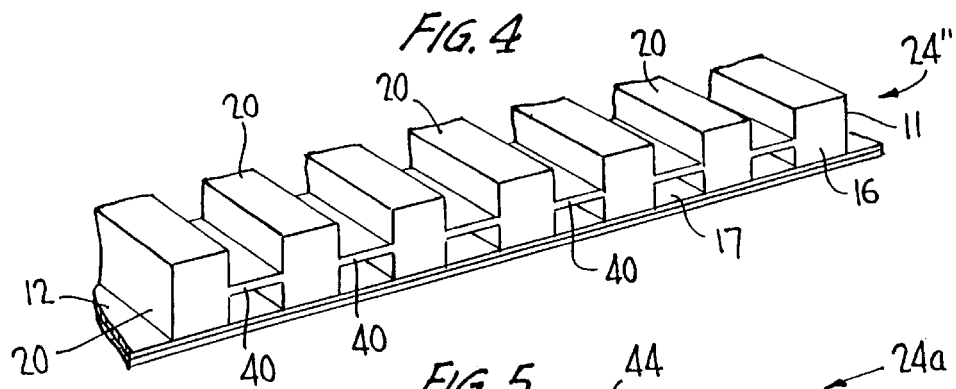
FIG. 4 is a cross-sectional view of a laminate structure showing the rib connectors between adjacent ribs forming the core of a laminate structure for obtaining a fine adjustment of the bendability characteristic of the laminate structure in accordance with the invention.

In a further modified embodiment of the invention as shown in FIG. 4, the sublaminate structure 24 of FIG. 1 is modified by including webbing 40 between adjacent rib members 20, which webbing decreases the flexibility or bending of the thus formed sublaminate structure 24". The flexibility of the sublaminate structure 24" can be selectively increased by selectively severing particular webs 40 between the rib members in those areas where bending of the sublaminate structure is required in accordance with the manner in which the sublaminate structure is to be conformed to a curved shape. In FIG. 4 the webs 40 are shown at approximately the midpoints of the rib members 20. However, it is understood that the webs 40 may be formed at other regions of the rib members to alter the flexible characteristics of the sublaminate structure 24".

Figure 5:
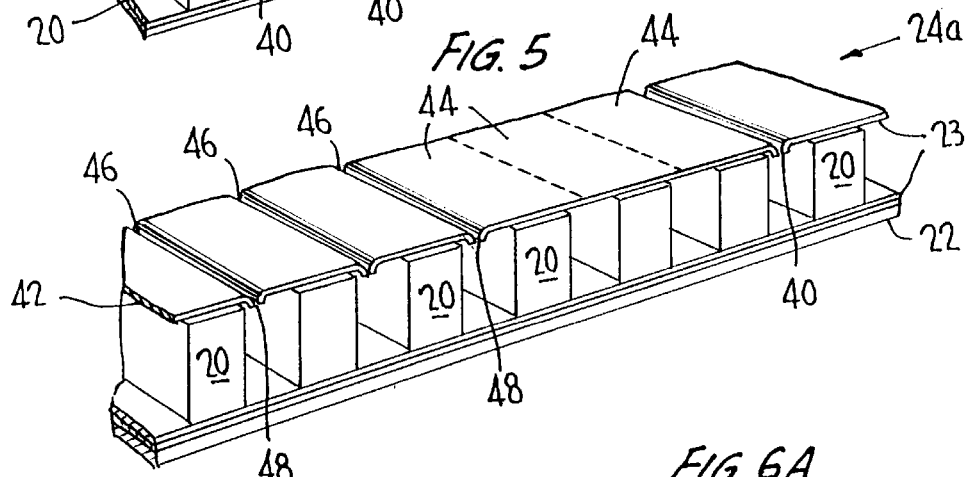
FIG. 5 illustrates the manner in which a laminate sheet in the laminate structure can be scored to alter the bendability characteristic of the laminate structure to control contouring of the laminated core structure in accordance with the present invention.

In a preferred embodiment of the invention as shown in FIG. 5, the laminate structure of FIG. 1 includes a backing member 42 which includes scored sections 44 between adjacent rib members 20. The bendability of the thus formed sublaminate structure 24a is determined by severing the backing member 42 at selected scored sections 44 as shown at regions 46 to obtain the desired flexibility of the sublaminate structure to be bent into a desired curved shape. This preferred embodiment of the invention may further be modified by including the web-linked rib member structure of FIG. 4 as the basic rib element instead of the individual rib member structure of FIG. 1. In FIG. 5, the severed sections 44 include bent-in portions 48 of the backing member 42 which limits the bendability of the laminate structure as that structure is bent to a desired radius.

The embodiment of FIG. 5 may also be modified to increase the bendability of the laminate structure 24a by multiple cutting of the scored sections 44 to increase the width of the selected scored sections. An increased cut width may also be obtained by using a wider cutting implement. The increased cut width of the scored sections enables the laminate structure 24a to bend to a greater extent than with a narrower cut width.

Figure 6A:
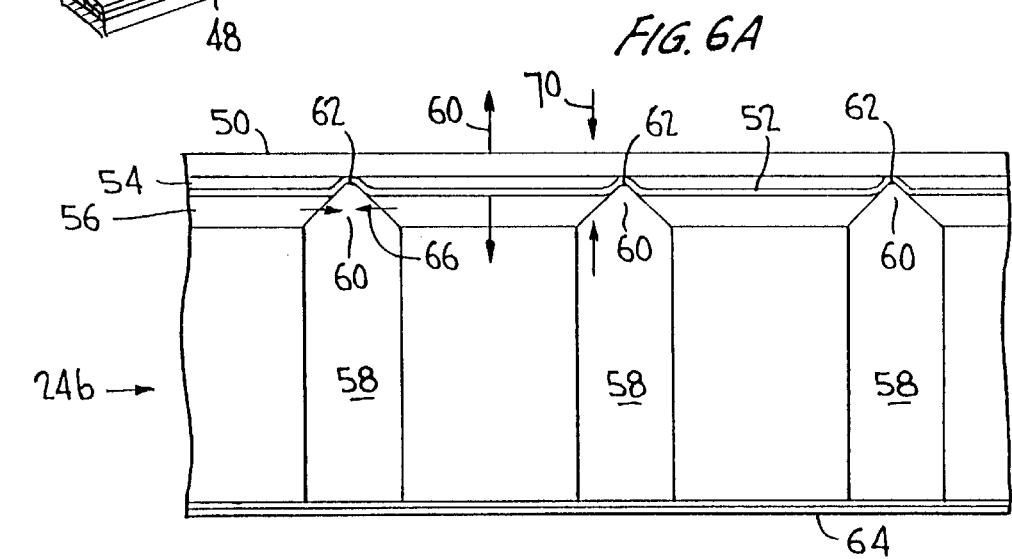
FIG. 6a is an exploded cross-sectional side view of a laminate structure in accordance with one embodiment of the invention illustrating a triangularly-shaped notch.

In a further embodiment of the invention illustrated in FIG. 7a, the laminate structure 24b comprises a high-impact surface sheet, a latex type paper strip 52 attached by adhesive 54 to the surface sheet and sandwiched between the surface sheet 50 and a flexible core material 56 which includes cutout sections 58 having notched portions 60 each having a peak portion 62 around which the latex type paper strip extends as shown in FIG. 6a. The substrate 24b is completed with a backer sheet 64 preventing bending of the substrate 24b unless the backing sheet 64 is cut as shown in FIG. 6b at portions 66.

The notched portions 60 enable the laminate substrate 24b to bend at peaked portions 62 at which portions the latex type paper 52 is compressed as indicated at 66. During bending of the laminate substrate 24b, the surface sheet 50, adhesive 54 and latex type paper 56 expand as indicated at 68. The same components of the laminates substrate 24b undergo compression as indicated at 70.

Figure 6B:
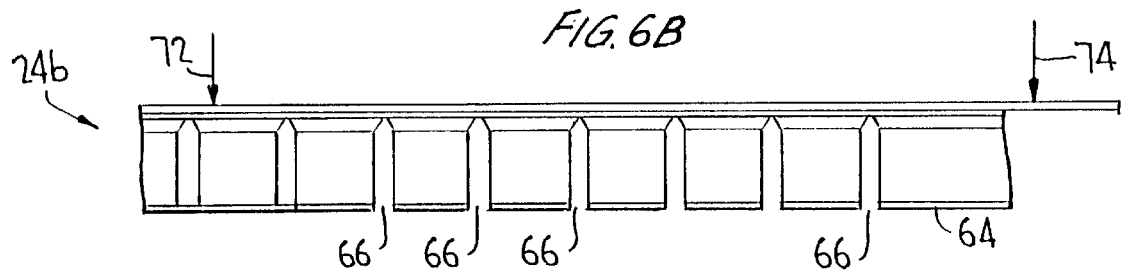

As indicated in FIG. 6b by forces 72, 74 applied to the laminate substrate beyond the area of cutout portions 66 of backer sheet 64, the laminate substrate 24b will tend to bend in a downward direction to form a desired bend radius. The cutout portions may be formed by simply cutting the backing sheet to remove the necessary portion of the backing sheet 64.

FIG. 7a illustrates a modified embodiment of that described above with respect to FIG. 4 and involves the addition of a backing sheet 76 to the opposite side of the laminate substrate 24c to which the surface sheet 22 is attached. A flexible laminate substrate is formed at desired locations by selectively cutting web sections 40 and the associated portion of the backing sheet 76 as indicated at 78 and 80, respectively.

FIGS. 7c and 7d illustrate the manner in which sublaminate substrates individually formed of rib members 82, 82' and 82" and a backing sheet 84, 84' and 84", respectively are stacked on top of one another and attached by an adhesive between a respective backing sheet and the adjacent rib member to form a sublaminate structure 24d. A surface sheet 86 is bonded to the top of sublaminate substrate 24d and the resulting laminate substrate 88 is made flexible by cutting through the backing sheets 84, 84' and 84" as illustrated in FIG. 7d at portions 90, 92 and 94.

In the modified embodiment of the invention shown in FIG. 8a a sublaminate structure 24e is formed of rib members each having a notch 98 formed on each side of the rib member and the rib members 96 are attached or bonded to a backing sheet 100. An accessory attachment 102 in the form of an "H" includes opposed gripping edges 103 at each end of the legs of the "H" as shown in FIG. 8a. The sublaminate structure 24e is then provided with a surface sheet (not shown) bonded either over the backing sheet 100 or attached to cover the open ends of the rib members opposite the backing sheet. With the backing sheet attached to sublaminate structure 24e over the backing sheet 100 the flexibility of the resultant laminate substrate is limited so that it will bend in a smaller radius than will the resultant laminate substrate formed with the surface sheet over the sublaminate substrate 24e opposite the backing sheet 100. In the latter circumstance, the bendability of the laminate substrate is obtained by severing the backing sheet along selected sections 104 between the rib members 96, as described above with respect to the embodiment of the invention disclosed in FIG. 5. In the former circumstance, the flexibility of the laminate structure is provided by the separation between the rib members as discussed above with respect to the embodiments of the invention disclosed in FIGS. 1 and 4.

In the embodiment of FIG. 8a wherein the surface sheet is applied to the sublaminate structure 24e opposite the backing sheet 100, accessory 102 may be attached to the offset projections 106 on each of rib members 96 by cutting through the backing sheet 100 along the associated severance regions 104 and passing the appropriate end of the attachment 102 into engagement with the desired rib member 96.

As shown in FIG. 8b, two sublaminate structures 24e' and 24e" may be attached together via the engagement of engagement projections 103' with severed web members 106, 108. In this embodiment it is understood that sublaminate structure 24e is attached to attachment 102 shown in FIG. 8b.

The embodiments of the invention described herein are intended for the purpose of illustrating the structure and function of the invention. Those skilled in the art of facing structures will recognize that the embodiments described herein are capable of modification and thus the scope of invention described herein is not to be limited to the specific exemplary embodiments of the invention described, but the scope of the invention is to be determined by the claims appended hereto and the equivalents to which the claimed structures are entitled.

What is claimed is:

1. A composite structural material having an outer surface for surface-covering applications, comprising:
   a sheet material having an outer surface and an opposing inner surface;
   a plurality of parallely-spaced rib members extending substantially across the width of said sheet material on the opposing inner surface and attached thereto by an adhesive with said sheet material being substantially flat;

the adhesive bond between the sheet material and the rib members being such that when the structural member is bent a self detachment of the sheet material from at least some of said rib members occurs allowing the sheet material to form a smooth curved shape devoid of ridges or planes; and a backing sheet attached to the opposite side of said rib members than said sheet material, and the flexibility of the composite structural material is altered by said backing sheet being cut between adjacent rib members.

2. A composite structural material having an outer surface for surface-covering applications, comprising:

a sheet material having an outer surface and an opposing inner surface;

a plurality of parallely-spaced rib members extending substantially across the width of said sheet material on the opposing inner surface and attached thereto by an adhesive with said sheet material being substantially flat;

the adhesive bond between the sheet material and the rib members being such that when the structural member is bent a self detachment of the sheet material from at least some of said rib members occurs allowing the sheet material to form a smooth curved shape devoid of ridges or planes; and a backing sheet between said sheet material and said plurality of rib members, and a notch being formed between adjacent rib members, said plurality of rib members are formed by parallely-spaced partial through cuts in an integral core member and each of the notches extending through said backing sheet toward said sheet material.

3. A component of a composite structural member, upon bending of the composite structural member a self detachment between the component and the composite structural member occurring allowing the composite structural member to form a smooth surface curve devoid of ridges or planes, the said component comprising:

a backing member in the form of a sheet of latex-type paper;

a plurality of parallely-spaced rib members attached in non-contacting relationship with one another to one surface of said backing member and thereby forming said component for attachment to a sheet material for forming the composite structural member; and the attachment between the rib members and the backing member is such that when the component is bent a self detachment of the rib members from the backing member occurs allowing the component to form a smooth surface curve devoid of ridges or planes.

4. A component of a composite structural member as claim d in claim 3, wherein the backing member is attached to the sheet material.

5. A component of a composite structural member as claimed in claim 3, wherein the plurality of rib members are attached to the sheet material.

* * * * *